US011639092B1

(12) United States Patent
Wright

(10) Patent No.: US 11,639,092 B1
(45) Date of Patent: May 2, 2023

(54) CONTROLLING STABILITY OF ELECTRIC VEHICLES

(71) Applicant: DIMAAG-AI, Inc., Fremont, CA (US)

(72) Inventor: Ian Wright, Woodside, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 17/656,564

(22) Filed: Mar. 25, 2022

(51) Int. Cl.
*B60K 1/04* (2019.01)
*B60L 50/60* (2019.01)
*B62D 49/06* (2006.01)
*B62D 49/08* (2006.01)
*B60L 15/20* (2006.01)

(52) U.S. Cl.
CPC ............... *B60K 1/04* (2013.01); *B60L 15/20* (2013.01); *B60L 50/60* (2019.02); *B62D 49/0678* (2013.01); *B62D 49/085* (2013.01); *B60L 2200/40* (2013.01)

(58) Field of Classification Search
CPC . B60K 1/04; B60L 15/20; B60L 50/60; B60L 2200/40; B62D 49/0678; B62D 49/085
See application file for complete search history.

(56) References Cited

U.S. PATENT DOCUMENTS

| 4,438,589 A | | 3/1984 | Matsushiro | |
| 5,291,847 A | * | 3/1994 | Webb | F03G 7/05 441/21 |
| 5,760,569 A | * | 6/1998 | Chase, Jr. | B60K 1/04 414/281 |
| 6,265,091 B1 | * | 7/2001 | Pierson | H01M 50/227 429/94 |
| 6,742,741 B1 | * | 6/2004 | Rivoli | B64D 27/06 244/93 |
| 10,543,905 B1 | * | 1/2020 | Kwon | B64D 27/24 |
| 10,773,780 B2 | | 9/2020 | Smith et al. | |
| 2003/0102176 A1 | * | 6/2003 | Bautista | B62K 5/027 280/124.103 |
| 2011/0264350 A1 | * | 10/2011 | Doi | B62K 11/007 701/90 |
| 2013/0256046 A1 | * | 10/2013 | Kyoden | B60K 1/04 180/68.5 |
| 2020/0062097 A1 | * | 2/2020 | Hara | B60K 11/04 |
| 2020/0239078 A1 | * | 7/2020 | Hung | B60L 50/66 |
| 2021/0384580 A1 | * | 12/2021 | Powell | G07C 5/085 |

\* cited by examiner

*Primary Examiner* — Frank B Vanaman
(74) *Attorney, Agent, or Firm* — Polygon IP, LLP

(57) ABSTRACT

Electric vehicles include adjustable battery positions and/or adjustable track widths for controlling vehicle stability. In some examples, an electric vehicle comprises a positioning mechanism configured to move the battery pack relative to the support structure (e.g., operable as the vehicle's frame) to change the vehicle's COG. The battery pack can be moved in response to other vehicle operations, e.g., COG changes caused by adding/moving loads, changes to the route grade, and the like. The battery pack can be slidably coupled to the support structure. In some examples, an electric vehicle comprises a track adjustment mechanism configured to move the vehicle's wheel axle relative to the support structure, along the wheel axle center axis, thereby changing the track width. The wheel axle can be coupled to a hub motor. In some examples, the battery is moved, and/or the track width is changed during the vehicle's operation.

19 Claims, 15 Drawing Sheets

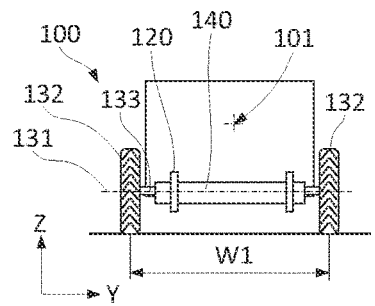
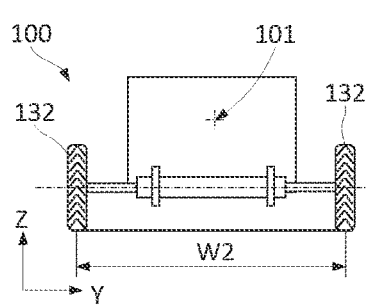
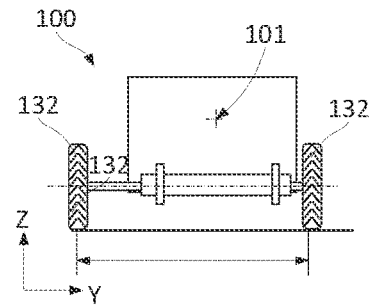
*FIG. 5A*  *FIG. 5B*  *FIG. 5C*
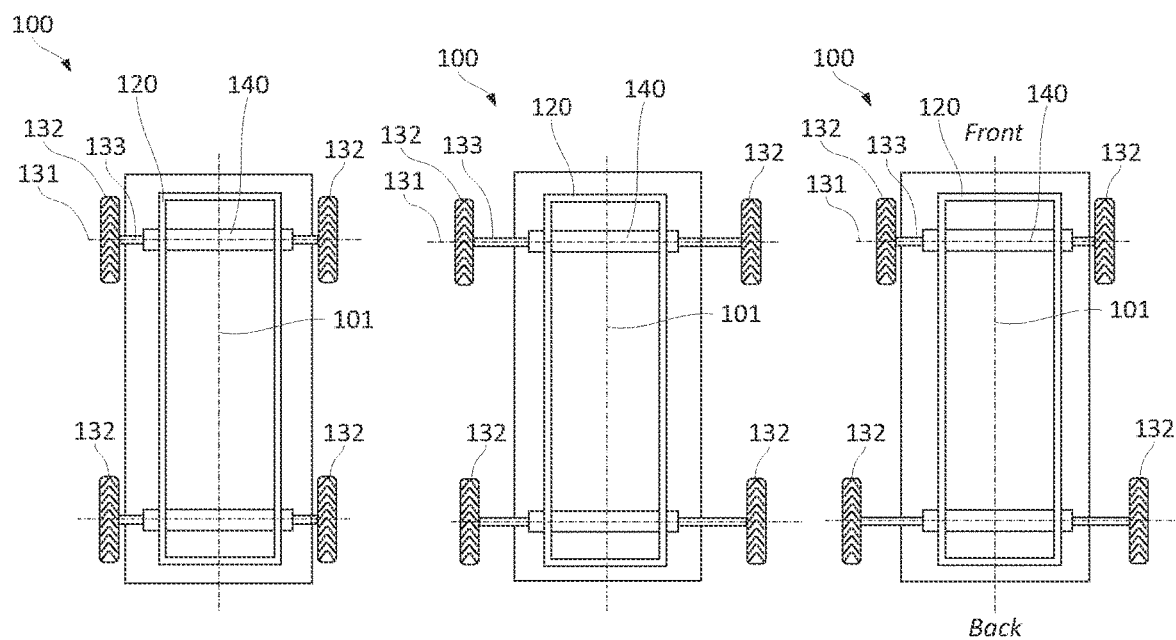
*FIG. 5D*  *FIG. 5E*  *FIG. 5F*

CONTROLLING STABILITY OF ELECTRIC VEHICLES

BACKGROUND

Electric vehicles are powered by onboard batteries (e.g., arranged into battery modules/packs) and use this power to propel and/or to perform various tasks. Batteries can be heavy and represent a large portion of the total vehicle weight. As such, batteries can have a significant impact on vehicle stability. For example, a battery is often positioned at the lowest possible point to lower the center of gravity (COG) of an electric vehicle. However, this approach may interfere with the vehicle's ground clearance. Some components (e.g., vehicle's frame) can limit the size and/or the position of the battery. Furthermore, the vehicle's COG can shift during vehicle operation, such as attaching new components (e.g., farming implements), lifting components (including vehicle's own components), and the like. Finally, certain operations (e.g., navigating on a slope) can benefit from different positions of the vehicle's COG.

What is needed are new methods and systems for controlling the stability of electric vehicles such as changing the battery position and/or track width.

SUMMARY

Described herein are electric vehicles with adjustable battery positions and/or adjustable track widths for controlling vehicle stability. In some examples, an electric vehicle comprises a positioning mechanism configured to move the battery pack relative to the support structure (e.g., operable as the vehicle's frame) to change the vehicle's COG. The battery pack can be moved in response to other vehicle operations, e.g., COG changes caused by adding/moving loads, changes to the route grade, and the like. The battery pack can be slidably coupled to the support structure. In some examples, an electric vehicle comprises a track adjustment mechanism configured to move the vehicle's wheel axle relative to the support structure, along the wheel axle center axis, thereby changing the track width. The wheel axle can be coupled to a hub motor. In some examples, the battery is moved, and/or the track width is changed during the vehicle's operation.

In some examples, an electric vehicle has a center of gravity and comprises a support structure, a battery pack, movably coupled to the support structure, and a positioning mechanism, coupled to the battery pack and configured to move the battery pack within the electric vehicle relative to the support structure thereby changing the center of gravity of the electric vehicle. The weight portion of the battery pack in the electric vehicle may be at least 30%. In some examples, the battery pack is movably relative to the support structure along two or more axes.

In some examples, the battery pack comprises a first component and a second component. Each of the first and second components is independently movable relative to the support structure.

In some examples, the battery pack comprises a pack enclosure and pack protrusions extending away from the pack enclosure and into the support structure, slidably engaging the battery pack and the support structure. For example, the support structure comprises a base and a lip, forming an open channel with the base. Each of the pack protrusions extends into the open channel thereby allowing the battery pack to slide relative to the support structure along one axis and support the battery pack relative to the support structure along two remaining axes. The base may be formed by a rectangular tube with an aspect ratio of at least 2. In some examples, the support structure forms an opening such that the pack enclosure protrudes into the opening and is surrounded by the support structure. For example, the pack enclosure comprises a first enclosure portion and a second enclosure portion. The first enclosure portion protrudes into the opening and is at least partially surrounded by the support structure. The second enclosure portion extends over a plane, defined by the support structure, and configured to slide and extend over the support structure.

In some examples, the pack enclosure comprises a center portion and an overhang portion. The center portion protrudes into the opening. The overhang portion extends outside the opening such that the support structure extends through a channel formed by the center portion and the overhang portion.

In some examples, the support structure is operable as a frame of the electric vehicle such that one or more additional components of the electric vehicle are fixedly coupled to the support structure. The positioning mechanism can be selected from the group consisting of a hydraulic cylinder and an electric linear actuator.

In some examples, the electric vehicle further comprises a controller and one or more sensors, communicatively coupled to the controller. The one or more sensors are configured to sense one or more characteristics selected from the group of the weight of the electric vehicle, pressure in one or more systems of the electric vehicle, road grade, and speed of the electric vehicle. The controller is configured to determine a desired position of the battery pack, relative to the support structure, based on the one or more characteristics received from the one or more sensors. In some examples, the battery pack is movable relative to the support structure while the electric vehicle is in motion.

In some examples, the electric vehicle further comprises an electric motor, configured to propel the electric vehicle. The electric motor remains electrically coupled to the battery pack while the battery pack is moved relative to the support structure. In the same or other examples, the electric vehicle comprises a temperature control system, fluidically coupled to the battery pack and configured to control the temperature of the battery pack by exchanging a thermal fluid with the battery pack. The temperature control system remains fluidically coupled to the battery pack while the battery pack is moved relative to the support structure.

In some examples, the electric vehicle further comprises a wheel axle and a wheel assembly, rotatably coupled to the wheel axle and comprising a wheel. The electric motor is a hub motor positioned in the wheel assembly. The electric motor is configured to rotate the wheel relative to the wheel axle. In some examples, the wheel axle has a rectangular cross-section for transferring reaction torque between the electric motor and the support structure.

In some examples, the electric vehicle further comprises a track adjustment mechanism, configured to move the wheel axle relative to the support structure along a wheel axle center axis. For example, the track adjustment mechanism comprises an outer sleeve, formed by or coupled to the support structure, and an outer linear bearing set slidably coupling the outer sleeve to the wheel axle while the wheel axle at least partially protrudes into the outer sleeve. In some examples, the outer linear bearing set comprises four pairs of linear bearings. Each of the four pairs is disposed between each side of the wheel axle and the support structure proximate to the ends of each side.

In some examples, the wheel axle forms an inner sleeve. The track adjustment mechanism further comprises an inner linear bearing set slidably coupling the inner sleeve to an additional wheel axle while the additional wheel axle at least partially protrudes into the inner sleeve. The wheel axle and the additional wheel axle are concentric. In the same or other examples, the track adjustment mechanism further comprises an additional linear bearing set slidably coupling the outer sleeve to the additional wheel axle while the additional wheel axle at least partially protrudes into the outer sleeve.

In some examples, the electric vehicle further comprises an additional wheel axle and an additional wheel, rotatably coupled and supported by the additional wheel axle. The wheel axle and the additional wheel axle are concentric. The track adjustment mechanism further comprises an additional outer linear bearing set slidably coupling the outer sleeve to the additional wheel axle while the additional wheel axle at least partially protrudes into the outer sleeve.

In some examples, the track adjustment mechanism comprises front control arms, rear control arms, and horizontal control arms, each pivotably coupled to the wheel axle and to the support structure.

In some examples, the electric vehicle is autonomous. For example, the electric vehicle can be selected from the group of a tractor and a loader.

Also provided is a method for controlling the stability of an electric vehicle comprising a controller, a battery pack, a positioning mechanism, and a support structure. The method comprises receiving one or more inputs at the controller of the electric vehicle, determining, by the controller and based on the one or more input to the controller, a set position of the battery pack relative to the support structure, and moving the battery pack relative to the support structure to the set position using the positioning mechanism, coupled to the battery pack and to the support structure, thereby changing the center of gravity of the electric vehicle.

In some examples, the electric vehicle comprises an electric motor electrically coupled to the battery pack. The electric motor remains electrically coupled to the battery pack while the battery pack is moved relative to the support structure. In some examples, the electric vehicle comprises a temperature control system fluidically coupled to the battery pack. The temperature control system remains fluidically coupled to the battery pack while the battery pack is moved relative to the support structure.

In some examples, moving the battery pack to the position is performed while the electric vehicle is moving. One or more inputs can be received from one or more sensors of the electric vehicle. Furthermore, one or more inputs at the controller can represent changing of the weight distribution of the electric vehicle.

In some examples, the electric vehicle is a tractor, while the one or more inputs at the controller represent coupling one or more tractor implements to the electric vehicle.

In some examples, the method further comprises receiving one or more additional inputs at the controller of the electric vehicle, determining a track width of the electric vehicle using the controller, and changing the track width of the electric vehicle by repositioning one or more wheel assemblies relative to the support structure using a track adjustment mechanism of a corresponding one of the one or more wheel assemblies. For example, each of the one or more wheel assemblies further comprises a wheel and a hub motor, electrically coupled to the battery pack and configured to rotate the wheel around a wheel axle.

BRIEF DESCRIPTION OF THE DRAWINGS

FIGS. 5A, 5B, 5C, 5D, 5E, and 5F are schematic views of different track width adjustments in an electric vehicle, in accordance with some examples.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

As noted above, electric vehicles utilize batteries to supply electrical power during vehicle operations. A battery often represents a major weight component in the electric vehicle, e.g., at least 30% of the total vehicle weight, at least 40%, or even at least 50%. For example, the weight of a 100 kWh battery pack can often exceed 500 kg. In some examples, the electric vehicle weight (including the battery) is between 2,000 kg and 4,000 kg or, more specifically, between 2,500 kg and 3,500 kg. As such, the battery plays an important role in the vehicle's stability. Furthermore, the battery position impacts the location of the vehicle's COG. However, it should be noted that other external factors (e.g., caused by various operations of the vehicle) can cause the vehicle's COG. Some of these factors will now be described with reference to FIGS. 1A-1F.

Figure 1A:
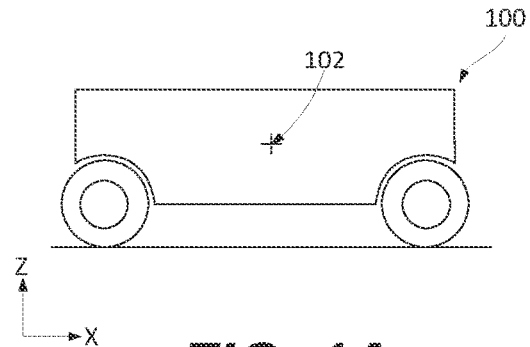
FIGS. 1A, 1B, 1C, 1D, 1E, and 1F are schematic illustrations of an electric vehicle showing changes in the vehicle's COG during various operating conditions.
Figure 1B:
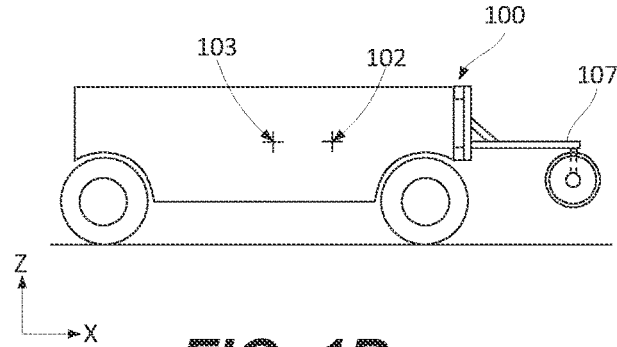

FIG. 1A is a reference showing COG 102 of electric vehicle 100. For example, COG 102 can be positioned around the center of electric vehicle 100, e.g., to evenly distribute the weight among the vehicle wheels. FIG. 1B illustrates the same electric vehicle 100 with load 107 attached to the back of electric vehicle 100. Some examples of load 107 include, but are not limited to, a farming implement (e.g., a sprayer), and the like. As a result of this load attachment, COG 102 is shifted to the right, i.e., in the direction of load 107. The level of this shift depends on the weight of electric vehicle 100, the weight of load 107, and the position of load 107 relative to electric vehicle 100 (e.g., how far load 107 extends from electric vehicle 100). In some examples, it may be desirable to maintain the original COG location, which is identified as target COG 103 in FIG. 1B. For example, target COG 103 may result in improved vehicle stability in comparison to the shifted COG 102. One conventional approach to controlling vehicle stability and countering COG shifts involves adding weights to a vehicle at one or more locations. For example, in FIG. 1B, a weight can be added to the front of electric vehicle 100. However, this approach increases the overall vehicle weight. Furthermore, these additional weights need to be available at the operating location of the vehicle, which may not be always possible. Finally, adding/removing weights takes time away from the vehicle operation.

Figure 1C:
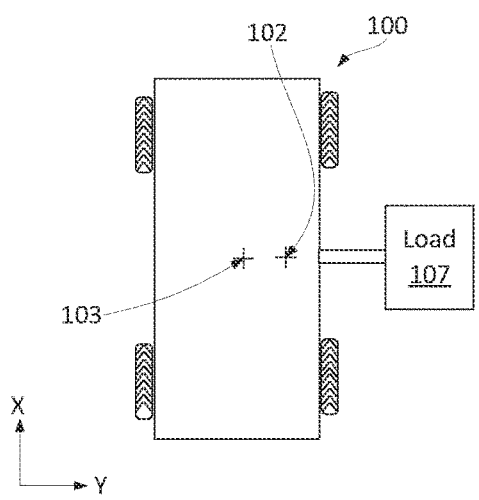
Figure 1D:
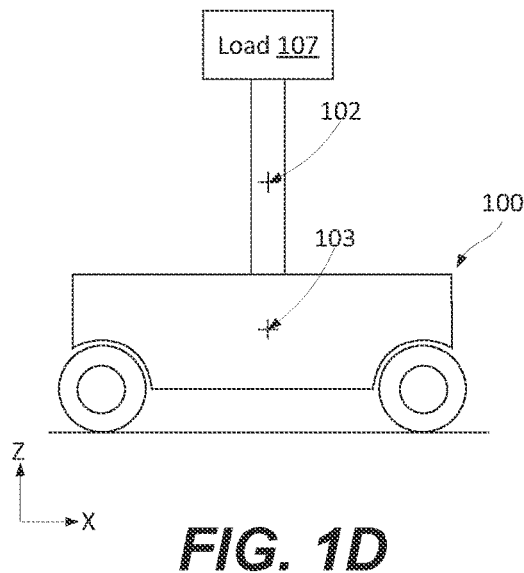
Figure 1E:
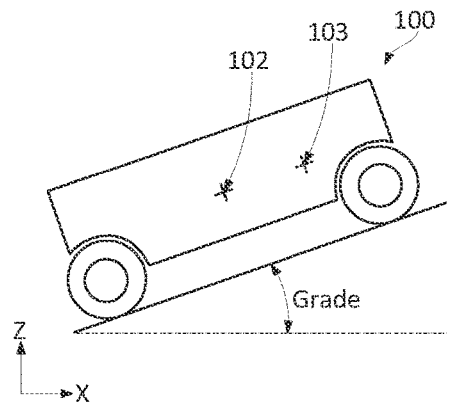
Figure 1F:
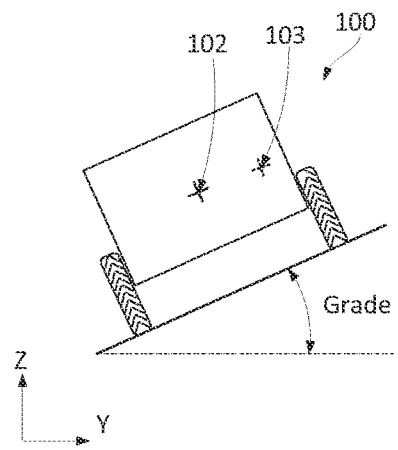

FIG. 1C illustrates electric vehicle 100 with load 107 attached to the vehicle's side, which can also shift COG 102 from target COG 103. FIG. 1D illustrates electric vehicle 100 with load 107 (or a part of the vehicle) being lifted above electric vehicle 100, which also shifts COG 102 relative target COG 103. For example, electric vehicle 100 can be a scissor lift or a forklift. In some examples, it may be desirable to shift the position of COG 102 without attaching any loads to electric vehicle 100. For example, FIGS. 1E and 1F illustrate electric vehicle 100 navigating a hill. In this example, target COG 103 would be desirable closer to the higher-positioned wheels to prevent the tipping of electric vehicle 100.

Described herein are electric vehicles with adjustable battery positions and/or adjustable track widths, which can be used for controlling the stability of electric vehicles and/or other purposes. Because of the large battery weight in comparison to the total vehicle weight, changing the battery position in an electrical vehicle has a significant impact on the vehicle's COG. Furthermore, the vehicle's battery pack can be arranged as one large unit, which helps with providing slidable coupling to the vehicle's support structure (e.g., vehicle's frame). In some examples, mechanical power components (e.g., electric motors) are integrated into wheels, e.g., as hub motors. The in-wheel position of these components allows using flexible electrical connections to the battery, which also helps with the battery moving aspects as well as track changing aspects. For example, transferring electrical power between two components that are movable relative to each other is generally easier than transferring torque. The electrical power can be accomplished using flexible electrical wiring, while the torque transfer requires complex mechanisms that can be expensive and heavy. In some examples, a track adjustment mechanism is configured to move the vehicle's wheel axle relative to the support structure along the wheel axle center axis thereby changing the track width.

Various examples of electric vehicle 100 are within the scope, such as a tractor and a loader. These types of electric vehicle 100 can be operated in various environments where adjusting the location of COG 102 can be useful.

Battery Moving Examples

FIGS. 2A-2E is a schematic illustration of electric vehicle 100 comprising battery pack 110, positioning mechanism 105, and support structure 120. Battery pack 110 can include one or more electrochemical cells, such as lithium-ion cells or, more specifically, lithium titanate (LTO) cells, lithium-nickel-manganese-cobalt oxide (NMC) cells, and the like. In some examples, battery pack 110 also includes other components used for interconnecting and controlling these electrochemical cells, such as bus bars, battery management systems (BMS), heat exchanges, and the like. Battery pack 110 is movably coupled to support structure 120, which can be the vehicle's frame or another structural component. For example, support structure 120 can be also used for attaching the vehicle's wheel axles as further described below. Positioning mechanism 105 is coupled to battery pack 110 and configured to move battery pack 110 within electric vehicle 100 thereby changing COG 102 of electric vehicle 100. Various examples of positioning mechanism 105 such as a hydraulic cylinder and an electric linear actuator.

Figure 2A:
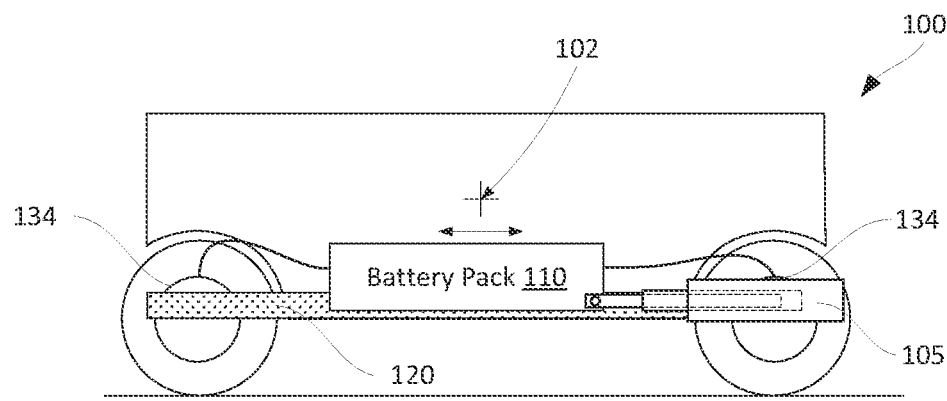
FIGS. 2A, 2B, 2C, 2D, 2E, 2F, and 2G are schematic illustrations of an electric vehicle comprising a battery pack movably coupled or, more specifically, slidably coupled to a support structure, in accordance with some examples.
Figure 2B:
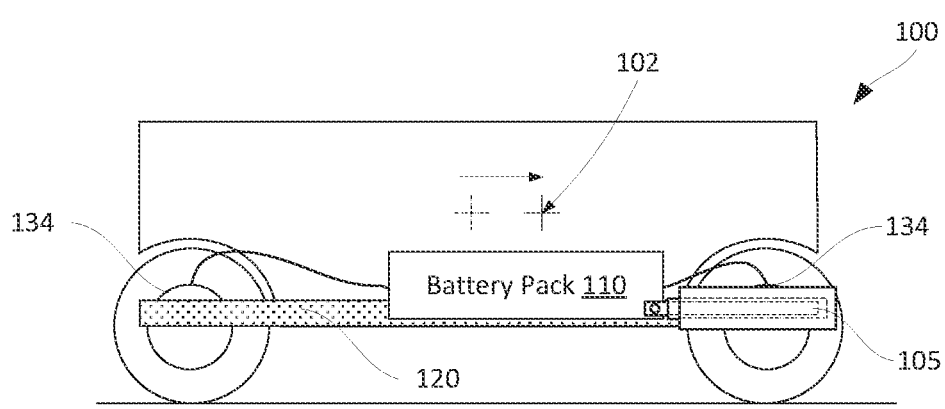

FIG. 2A illustrates electric vehicle 100 with an intermediate position of battery pack 110 and a corresponding location of COG 102. In this example, battery pack 110 can be moved along the X-axis (e.g., to the front or back of electric vehicle 100) using positioning mechanism 105, while battery pack 110 remains supported by support structure 120. This movement shifts the location of COG 102. For example, FIG. 2B illustrates electric vehicle 100 with battery pack 110 moved to the right, relative to the position shown in FIG. 2A. This battery pack movement also corresponds to the shift in COG 102 (in the same direction). It should be noted that the shift in COG 102 is smaller than the battery pack movement because battery pack 110 represents only a part of the total vehicle weight. It should be noted that battery pack 110 maintains all of its operating connections (e.g., electrical connections, thermal fluid connections) while battery pack 110 is being moved. Furthermore, in some examples, battery pack 110 can be moved dynamically, e.g., while electric vehicle 100 is moving and/or performing various operations. In fact, the movement of battery pack 110 can be triggered by these operations of electric vehicle 100 (e.g., attaching or lifting a load, going uphill).

Figure 2C:
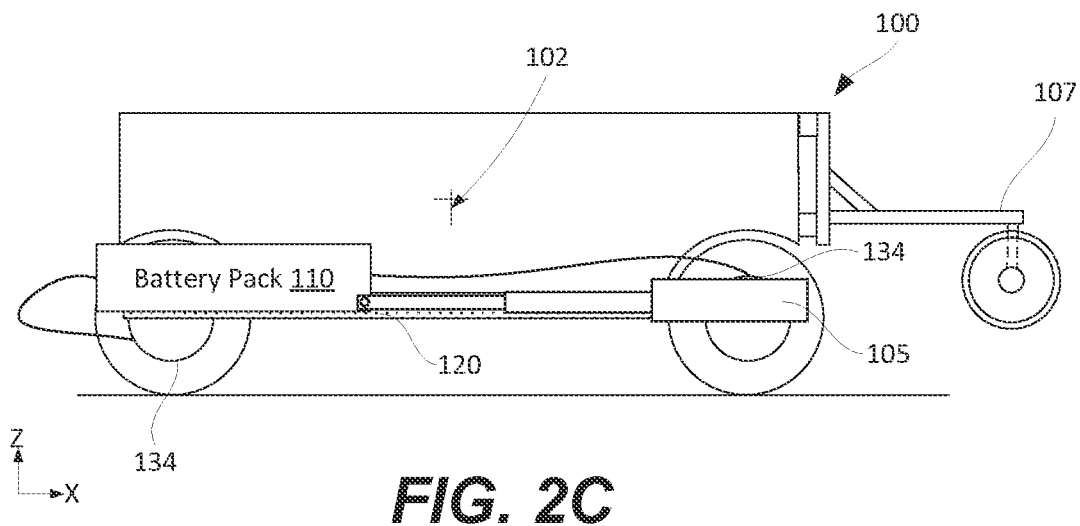

In some examples, battery pack 110 is moved to compensate for the location changes of COG 102 caused by changing the configuration of electric vehicle 100. For example, FIG. 2C illustrates electric vehicle 100 with load 107 attached to the back of electric vehicle 100. This addition of load 107, unless compensated for, would have shifted the location of COG 102 in the direction of load 107. However, as shown in FIG. 2C, battery pack 110 is moved in the opposite direction (from load 107) to maintain the location of COG 102.

Figure 2D:
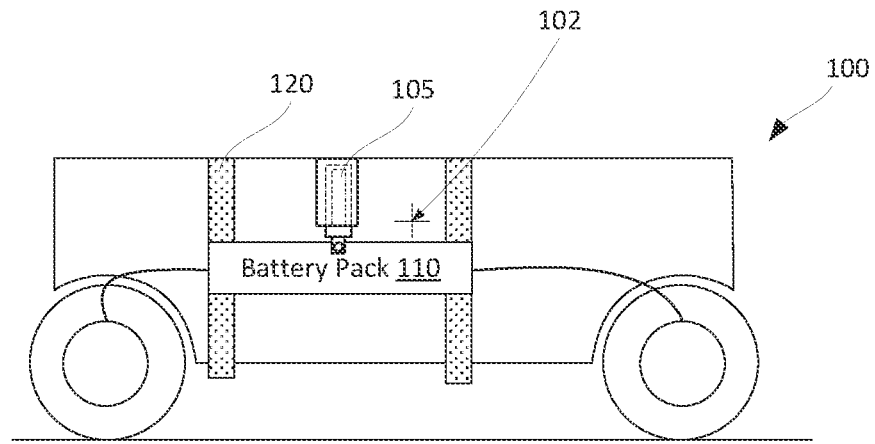
Figure 2E:
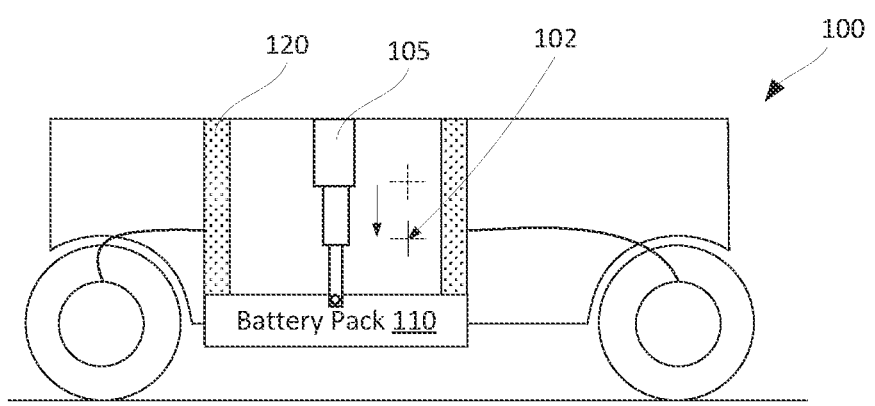
Figure 2F:
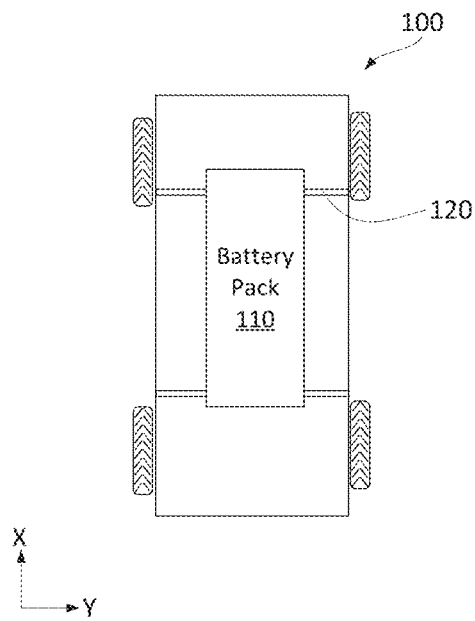
Figure 2G:
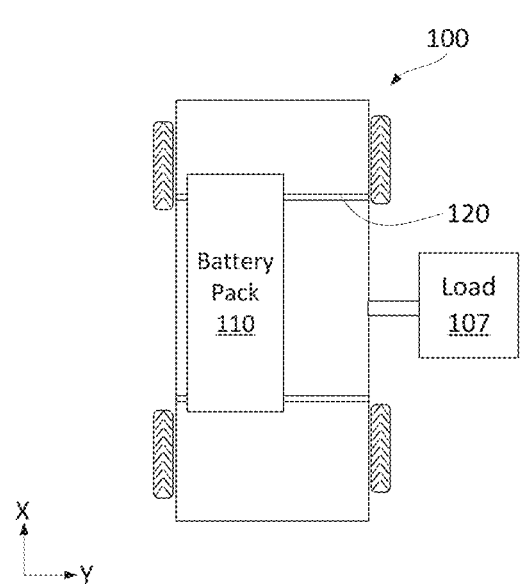
Figure 2H:
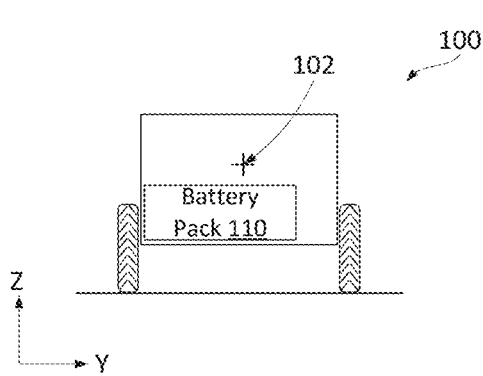
FIGS. 2H and 2I are schematic illustrations of an electric vehicle with a tiltable battery pack, in accordance with some examples.
Figure 2I:
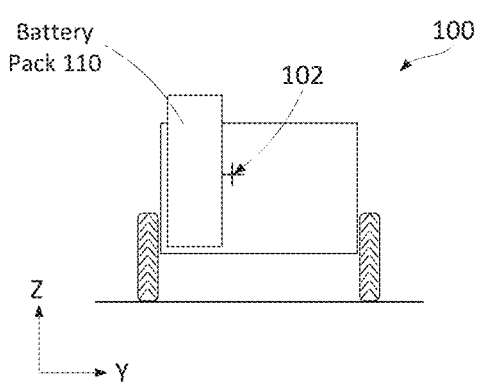

In some examples, battery pack 110 is movable relative to support structure 120 along two or more axes. FIGS. 2A, 2B, and 2C illustrate an example where battery pack 110 is movable along the X-axis, which may be referred to as front-back movement. FIGS. 2D and 2E illustrate an example where battery pack 110 is movable along the Z-axis, which may be referred to as up-down movement. Finally, FIGS. 2F and 2G illustrate an example where battery pack 110 is movable along the Y-axis, which may be referred to as side-to-side movement. All of these are examples of linear movements of battery pack 110. In some examples, battery pack 110 is tiltable as, e.g., is schematically shown in FIGS. 2H and 2I. In this example, battery pack 110 is tilted around an axis, which is parallel to the X-axis. However, tilting around one or more other axes is also within the scope.

Figure 2J:
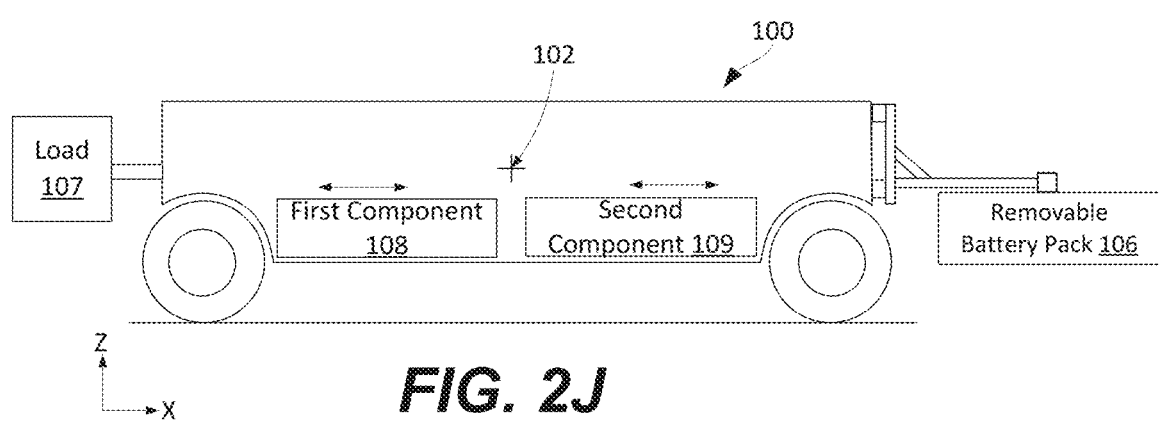
FIG. 2J is a schematic illustration of an electric vehicle with multiple independently movable components, in accordance with some examples.

In some examples, battery pack 110 is a single component. Alternatively, battery pack 110 comprises multiple components, such as first component 108 and second component 109 as, e.g., is shown in FIG. 2J. In other examples, first component 108 can represent battery pack 110 while second component 109 can represent another sufficiently heavy component (e.g., a range extender). In general, first component 108 and second component 109 are independently movable within electric vehicle 100. First component 108 and second component 109 can be independently moved along the same axis (e.g., axis X-axis in FIG. 2J). Alternatively, first component 108 and second component 109 can be independently moved along different axes. Independent movements of multiple components provide additional granularity in controlling the vehicle's stability. Furthermore, FIG. 2J illustrates removable battery pack 106, which can be supported, for example, using the tractor's 3-point connection. For example, load 107 may be attached to the front of electric vehicle 100, while removable battery pack 106 may be attached to the back to balance the weight and maintain COG 102 at the desired location. Alternatively, removable battery pack 106 may be attached to the front of electric vehicle 100 and/or on the side of electric vehicle 100. In general, removable battery pack 106 is attached opposite to load 107. Similar to battery pack 110 (which may be referred to as a primary battery pack), removable battery pack 106 is electrically connected to various power components of electric vehicle 100 such as electric motor 170. Removable battery pack 106 may be used in addition or instead of one or more movable battery packs that are not removable.

Figure 3A:
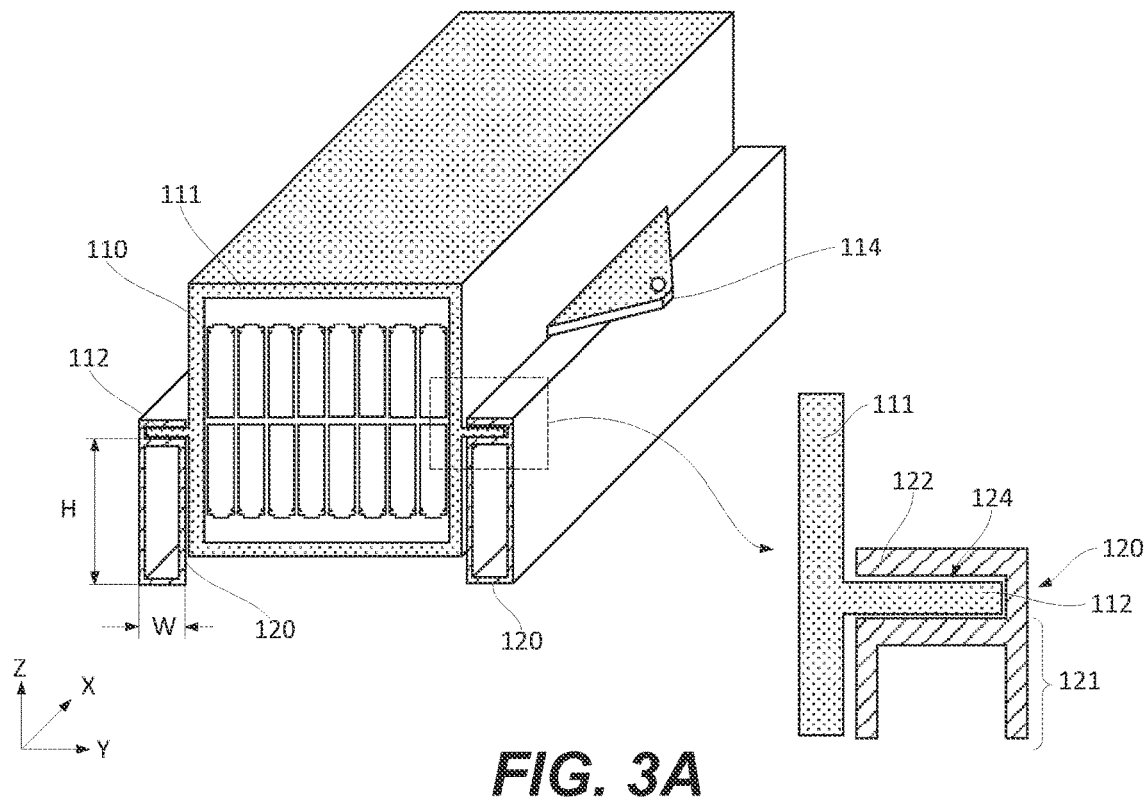
FIG. 3A is a schematic cross-sectional view of a battery pack slidably coupled to a support structure, in accordance with some examples.

Various examples of support structure 120 will now be described with reference to FIGS. 3A-3D. In these examples, battery pack 110 is configured to slide along the X-axis. For example, roll bearings and/or slidable bearings may be used for this purpose. One having ordinary skill in the art would appreciate that these features can be used for moving battery pack 110 along other axes. Referring to FIG. 3A, battery pack 110 comprises pack enclosure 111 and pack protrusions 112 extending on both sides of pack enclosure 111 and away from pack enclosure 111 along the Y-axis.

Figure 3B:
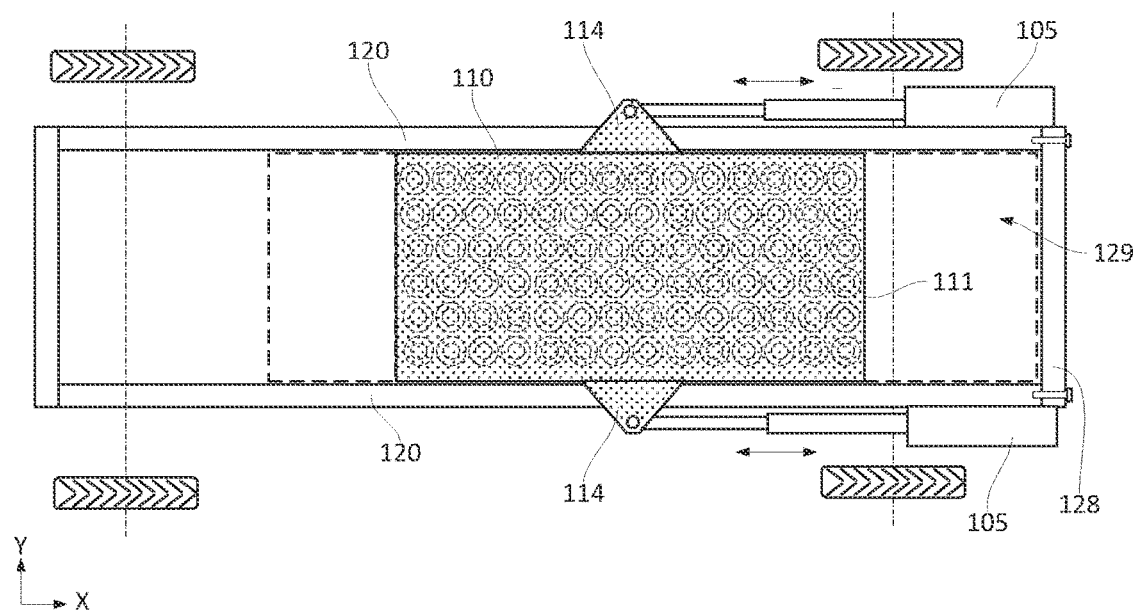
FIG. 3B is a schematic top view of the battery pack and support structure in FIG. 3A, in accordance with some examples.

Referring to FIGS. 3A and 3B, support structure 120 can be operable as a frame of electric vehicle 100 supporting battery pack 110 and other components, such as wheel axles, power electronics, operating equipment, and the like. While battery pack 110 is slidably supported on support structure 120, other components can be fixedly attached to support structure 120. In some examples, support structure 120 comprises base 121 and lip 122, connected to base 121 and forming open channel 124. Open channel 124 faces toward battery pack 110 such that pack protrusion 112 extends into open channel 124. More specifically, support structure 120 comprises two bases 121 (on each side of battery pack 110) forming two open channels 124 (facing each other and battery pack 110), each receiving one of pack protrusions 112 as, e.g., is schematically shown in FIG. 3A. A combination of open channels 124 and pack protrusions 112 allows battery pack 110 to slide relative to support structure 120 along the X-axis while being supported along the Y-axis and Z-axis. While FIG. 3A illustrates support structure 120 having open channels 124 and, separately, battery pack 110 having pack protrusions 112 extending into open channels 124, other examples are also within the scope. For example, protrusions can be parts of support structure 120, while channels can be part of battery pack 110.

In some examples, base 121 is formed by a rectangular tube, e.g., to minimize bending around the Y-axis while supporting the weight of battery pack 110 (and other components that can be attached to support structure 120). Unless controlled and minimized, this bending can jam pack protrusions 112 inside open channels 124 of support structure 120. For example, the aspect ratio (H/W) can be at least 1.5, at least 2, or even at least 3.

In some examples, battery pack 110 comprises connecting protrusions 114, e.g., extending on each side of pack enclosure 111. Connecting protrusions 114 can be coupled to positioning mechanism 105 as, e.g., is shown in FIG. 3B. Various examples of positioning mechanism 105 are within the scope, such as hydraulic cylinders, linear actuators, and the like.

Referring to FIGS. 3A and 3B, battery pack 110 or, more specifically, pack enclosure 111 is inserted into opening 129 formed by support structure 120. In other words, support structure 120 surround pack enclosure 111. In some examples, support structure 120 comprises support end 128 (e.g., as shown in FIG. 3B), which can be removed from the rest of support structure 120. When support end 128 is removed, battery pack 110 can slide into opening 129 formed by support structure 120, or, more specifically, pack protrusions 112 can slide into open channels 124.

It should be noted that in the example of FIGS. 3A and 3B, the size of pack enclosure 111 is limited by the size (width) of opening 129 formed by support structure 120. Furthermore, opening 129 formed by support structure 120 can limit the sliding range of battery pack 110 (e.g., in the direction along the X-axis). To address these limitations, pack enclosure 111 can be specifically configured to protrude beyond opening 129 formed by support structure 120 as will now be described with reference to FIGS. 3C, 3D, and 3E.

Figure 3C:
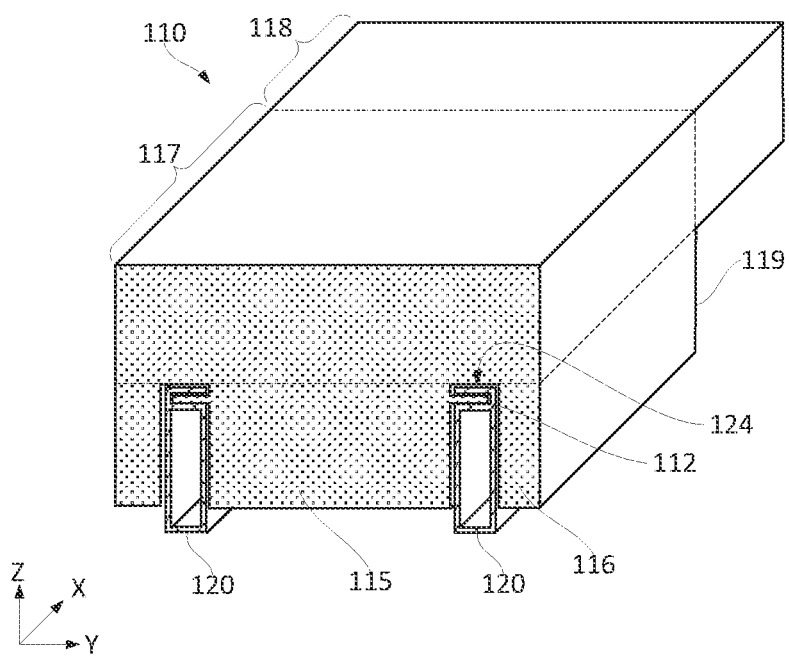
FIG. 3C is a schematic cross-sectional view of a battery pack comprising two enclosure portions such that one of these portions is configured to slide over a support structure, in accordance with some examples.

Referring to FIG. 3C, pack enclosure 111 comprises first enclosure portion 117 and second enclosure portion 118. The height (in the Z-direction) of first enclosure portion 117 is greater than the height of second enclosure portion 118. First enclosure portion 117 protrudes into opening 129 and is at least partially surrounded by support structure 120. For example, first enclosure portion 117 comprises center portion 115 protruding into opening 129. In some examples, this center portion 115 comprises pack protrusions 112 extending into open channel 124 of support structure 120.

Figure 3D:
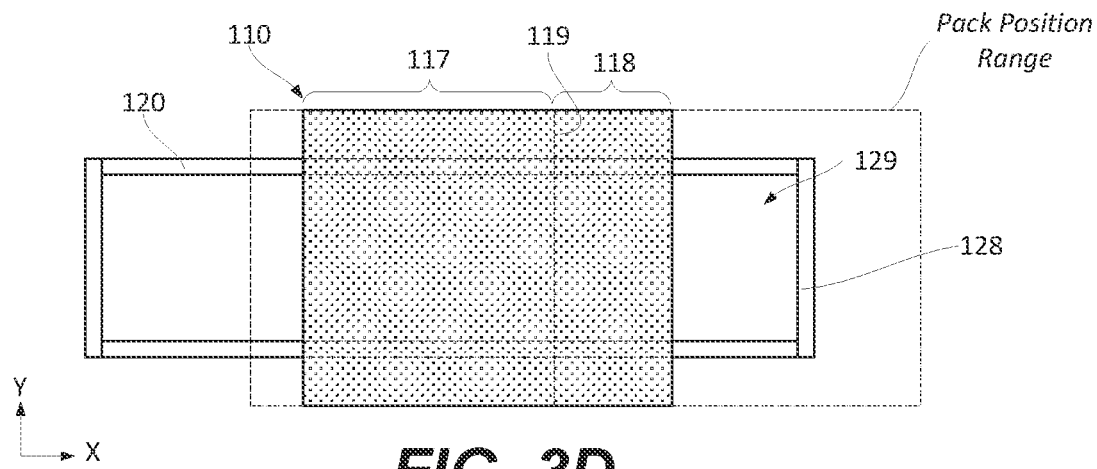
FIGS. 3D and 3E are schematic top views of the battery pack and support structure in FIG. 3C, showing two different positions of the battery pack relative to the support structure.
Figure 3E:
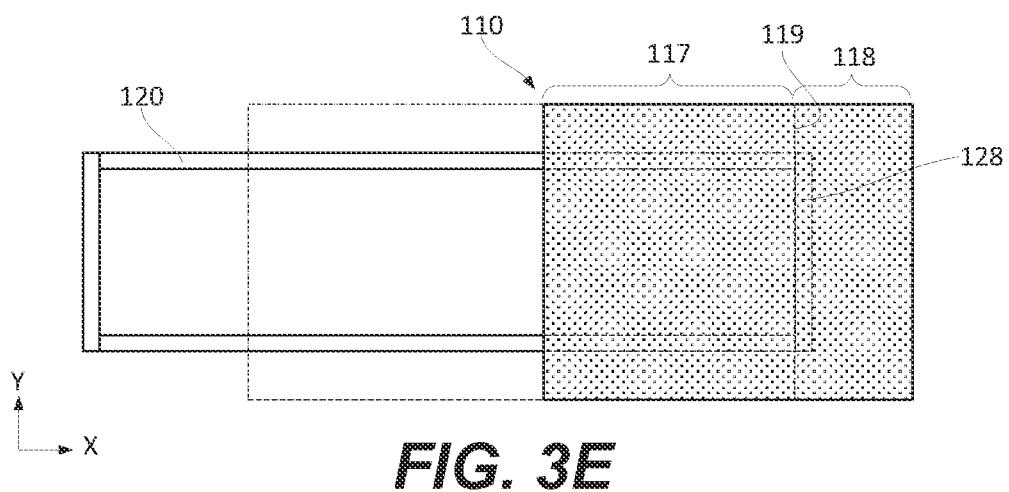

Second enclosure portion 118 extends over the plane, defined by support structure 120 and parallel to the X-Y plane, and is configured to slide and extend over support structure 120 as, e.g., is schematically shown in FIGS. 3D and 3E. Specifically, FIGS. 3D and 3E illustrate support end 128, which defines, at least in part, the boundary of opening 129. FIG. 3E illustrates, second enclosure portion 118 extending over and past support end 128. In some examples, this support end 128 can be positioned proximate to the front axle of electric vehicle 100. For example, the front axle of various types of electric vehicle 100 (e.g., a tractor) can experience higher weight deviations during operations (e.g., adding a tractor implement on the back of the tractor). Alternatively, this support end 128 can be positioned proximate to the rear axle of electric vehicle 100 (e.g., a loader/forklift).

It should be noted that first enclosure portion 117 protrudes into opening 129 and can slide to support end 128 but not past support end 128. The boundary between first enclosure portion 117 and second enclosure portion 118 can be defined by half side 119, which is a part of first enclosure portion 117 and extends from second enclosure portion 118. This half side 119 can be operable as a positive stop when half side 119 reaches and contacts support end 128. In other words, the position of half side 119 and support end 128 can define one end of the sliding range of battery pack 110 relative to support structure 120.

Extending second enclosure portion 118 past support end 128 provides greater control over the position of COG 102, e.g., by allowing at least a portion of battery pack 110 to slide past support end 128. Furthermore, the addition of second enclosure portion 118 helps to increase the capacity of battery pack 110. However, it should be noted that positioning second enclosure portion 118 above support structure 120 can raise the position of COG 102. This concern can be addressed with special overhangs, which will now be described with reference to FIG. 3C.

Referring to FIG. 3C, in some examples, pack enclosure 111 comprises center portion 115 and overhang portion 116. Center portion 115 protrudes into opening 129. Overhang portion 116 extends outside opening 129 such that support structure 120 extends through a channel formed by center portion 115 and overhang portion 116. Similar to second enclosure portion 118, overhang portion 116 helps to increase the capacity of battery pack 110. Furthermore, overhang portion 116 helps to maintain COG 102 at a lower level (unlike second enclosure portion 118). Finally, overhang portion 116 allows using support structure 120 with a small width (in the Y direction) without sacrificing the battery pack capacity.

Track Adjustment Examples

Referring to FIGS. 2A-2C, in some examples, electric vehicle 100 comprises electric motor 170, configured to propel electric vehicle 100. Electric motor 170 remains electrically coupled to battery pack 110 while battery pack 110 is moved relative to support structure 120. In more specific examples, electric vehicle 100 comprises electric motor 170 for each wheel. For example, an in-hub motor can be used to drive the corresponding wheel. This motor-per-wheel configuration provides exceptional traction control (e.g., delivering torque where it is needed) and can be also used to make electric vehicle 100 more maneuverable (e.g., through some torque steering aspects).

Figure 4A:
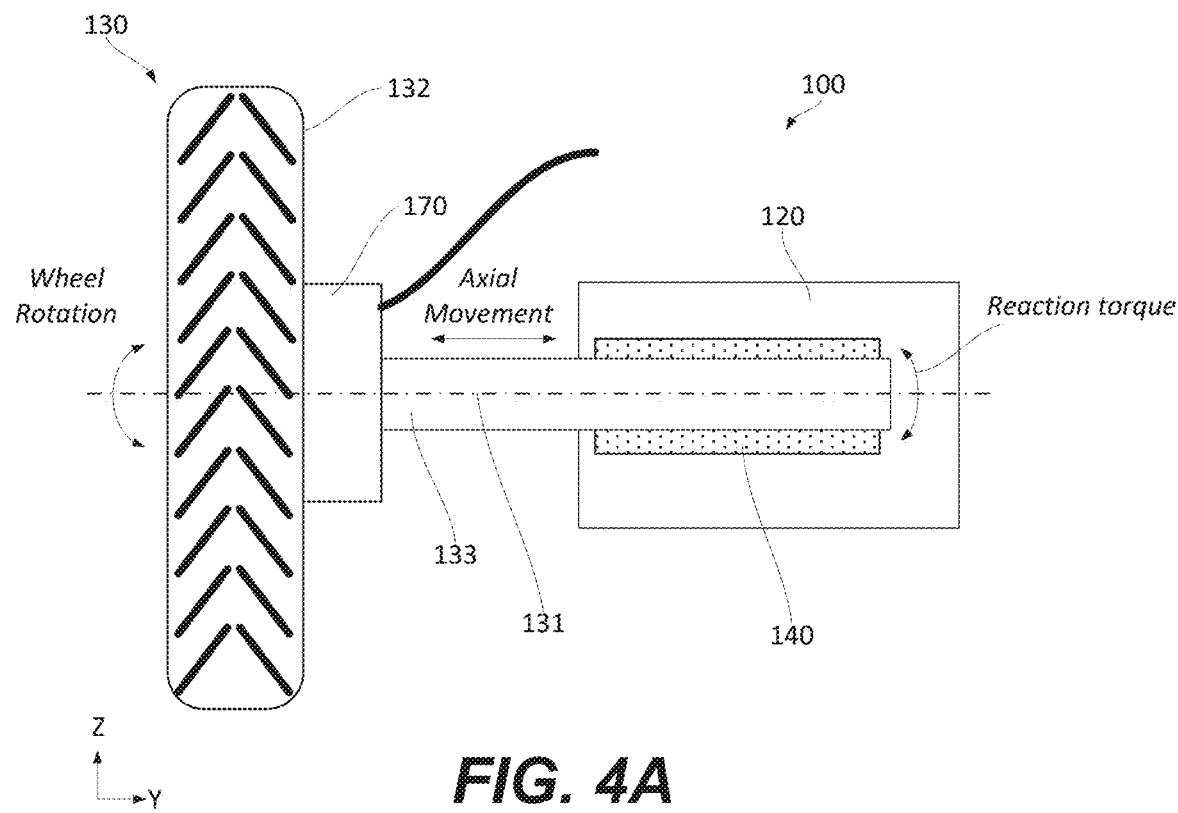
FIGS. 4A, 4B, and 4C are schematic views of a wheel assembly that is slidably coupled to a support structure, in accordance with some examples.
Figure 4B:
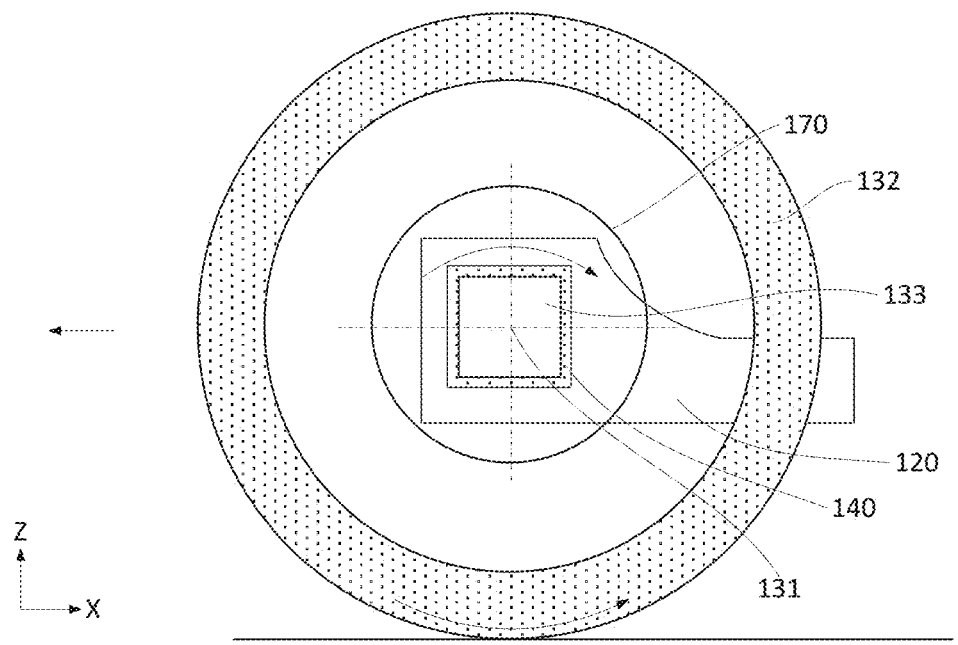
Figure 4C:
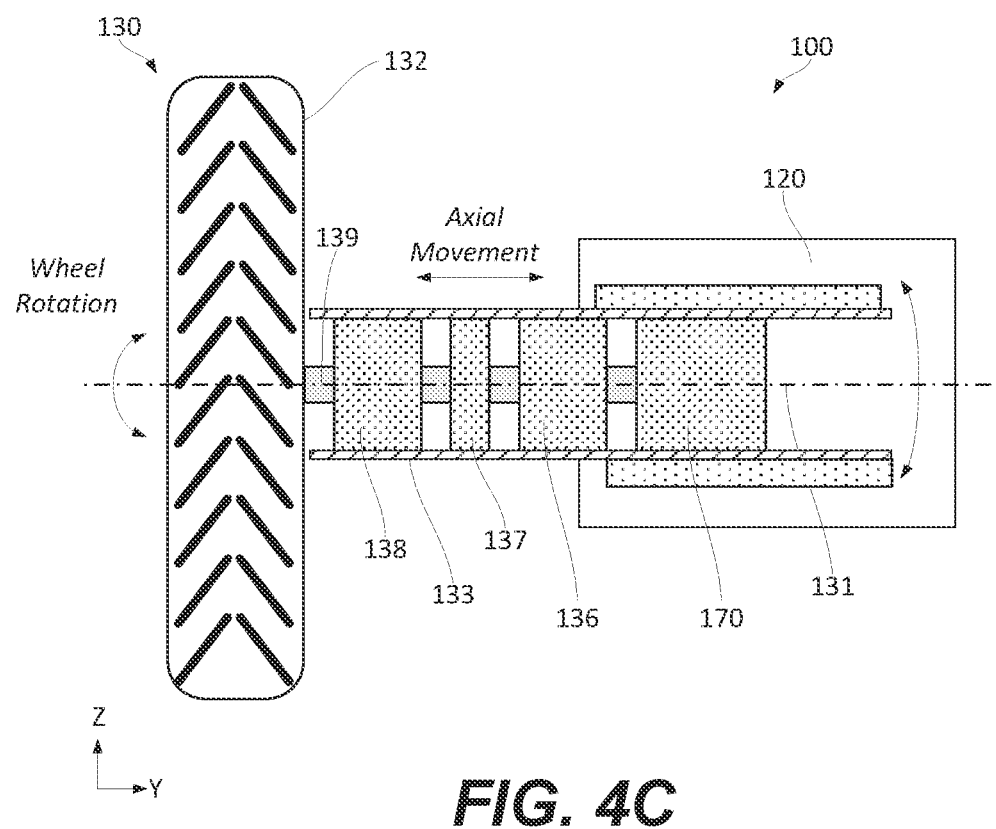

Referring to FIGS. 4A-4C, electric vehicle 100 comprises wheel axle 133 and wheel assembly 130, rotatably coupled to wheel axle 133. Wheel assembly 130 comprises wheel 132 and electric motor 170, which can be a hub motor. Electric motor 170 is configured to rotate wheel 132 relative to wheel axle 133. In other words, wheel axle 133 is not rotatable, which is different from many types of conventional vehicles where axles are rotated to drive the wheel. In the examples shown in FIGS. 4A-4C, wheel axle 133 is coupled to support structure 120 and is used for transferring the reaction torque between electric motor 170 and support structure 120. In some examples, wheel axle 133 has a rectangular cross-section or, more specifically, a square cross-section, e.g., as shown in FIG. 4B.

FIG. 4C illustrates additional components of wheel assembly 130 such as motor-side gearbox 136, brakes 137, wheel-side gearbox 138, and shaft 139. For example, electric motor 170 can drive the first part of shaft 139, coupled to motor-side gearbox 136. Motor-side gearbox 136 allows using a high-speed electric motor. The second part of shaft 139 couples motor-side gearbox 136 to wheel-side gearbox 138. This second part of shaft 139 can be also coupled to brakes 137, which is also coupled to wheel axle 133 and can be used for braking. Finally, the third part of shaft 139 is connected to wheel-side gearbox 138 and wheel 132. In some examples, wheel 132, wheel-side gearbox 138, brakes 137, and one or more parts of shaft 139 are standard parts of a tractor that is converted into electric vehicle 100 by adding various components (e.g., electric motor 170, battery pack 110) described in this disclosure.

In some examples, electric vehicle 100 further comprises track adjustment mechanism 140, configured to move wheel axle 133 relative to support structure 120 along wheel center axis 131, e.g., shown as the axial movement in FIG. 5A-5F. The track width change can be symmetrical relative to center axis 101 of electric vehicle 100 as, e.g., is schematically shown in FIGS. 5A and 5B. Alternatively, this adjustment (and the position of wheels 132) can be asymmetrical as, e.g., is shown in FIG. 5C. In some examples, the track width change is the same on both axles, e.g., is schematically shown in FIGS. 5D and 5E. Alternatively, this adjustment can be different on different axles as, e.g., is shown in FIG. 5F. Specifically, FIG. 5F illustrates an example where the track width of the front axle is narrower than the track width of the rear axle. Alternatively, the track width of the rear axle is narrower than the track width of the front axle. In general, the position of each wheel 132, relative to the rest of electric vehicle 100 or, more specifically, relative to support structure 120 can be adjusted independently from any other wheel.

This movement of wheel axle 133 is used to adjust the track width of electric vehicle 100. For example, electric vehicle 100 can be used for various agricultural applications with track adjustments used to accommodate different widths of rows, different soil types requiring specific track widths, vehicle stability, and other like reasons.

Referring to FIGS. 6A-6D, in some examples, track adjustment mechanism 140 comprises outer sleeve 142, formed by or coupled to support structure 120. Track adjustment mechanism 140 comprises outer linear bearing set 144 slidably coupling outer sleeve 142 to wheel axle 133 while wheel axle 133 at least partially protrudes into outer sleeve 142. Outer linear bearing set 144 allows wheel axle 133 to move relative to outer sleeve 142 along wheel center axis 131 thereby adjusting the track.

Figure 6A:
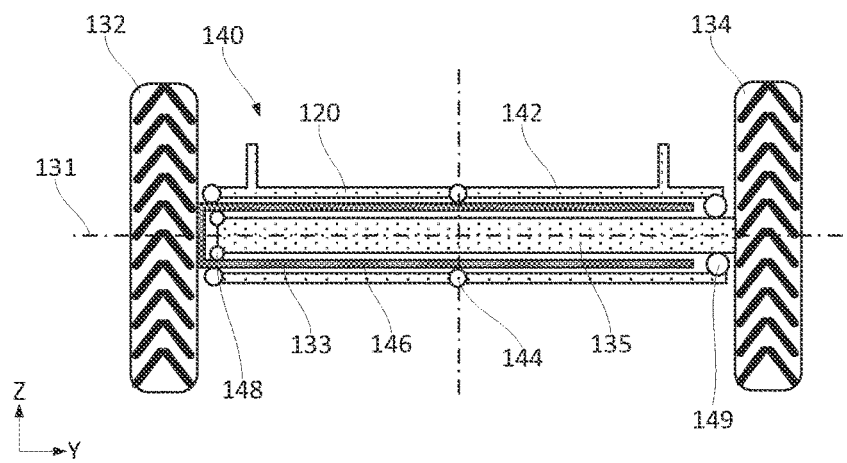
FIGS. 6A, 6B, 6C, 6D, and 6E are schematic cross-sectional views of different examples of track adjustment mechanisms comprising sleeve-type structures.
Figure 6B:
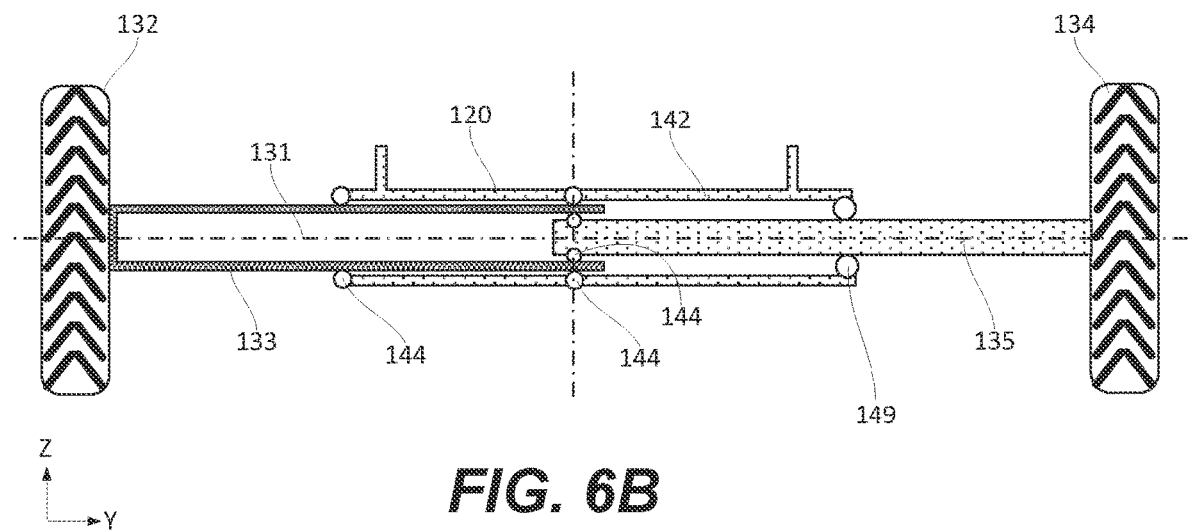
Figure 6C:
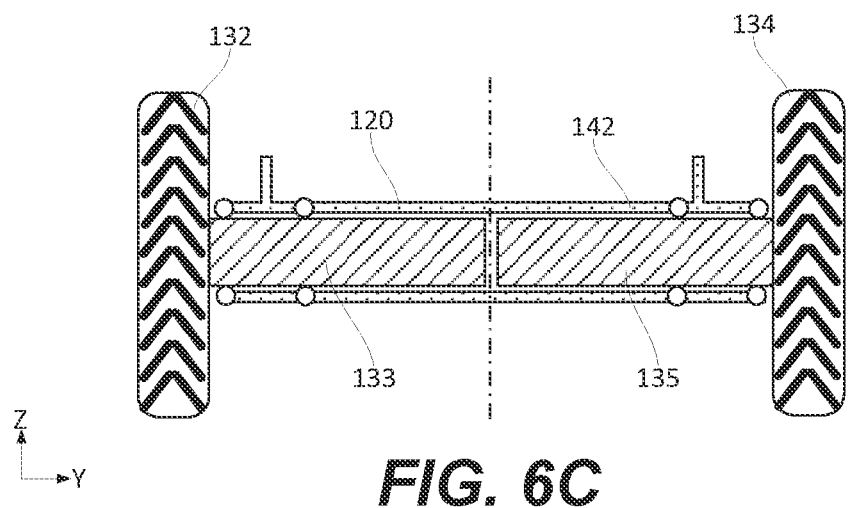
Figure 6D:
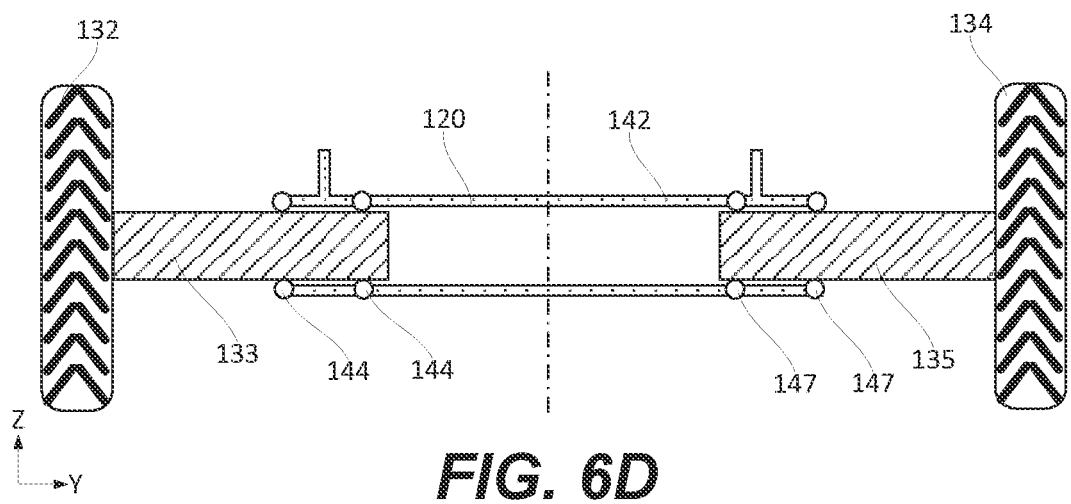
Figure 6E:
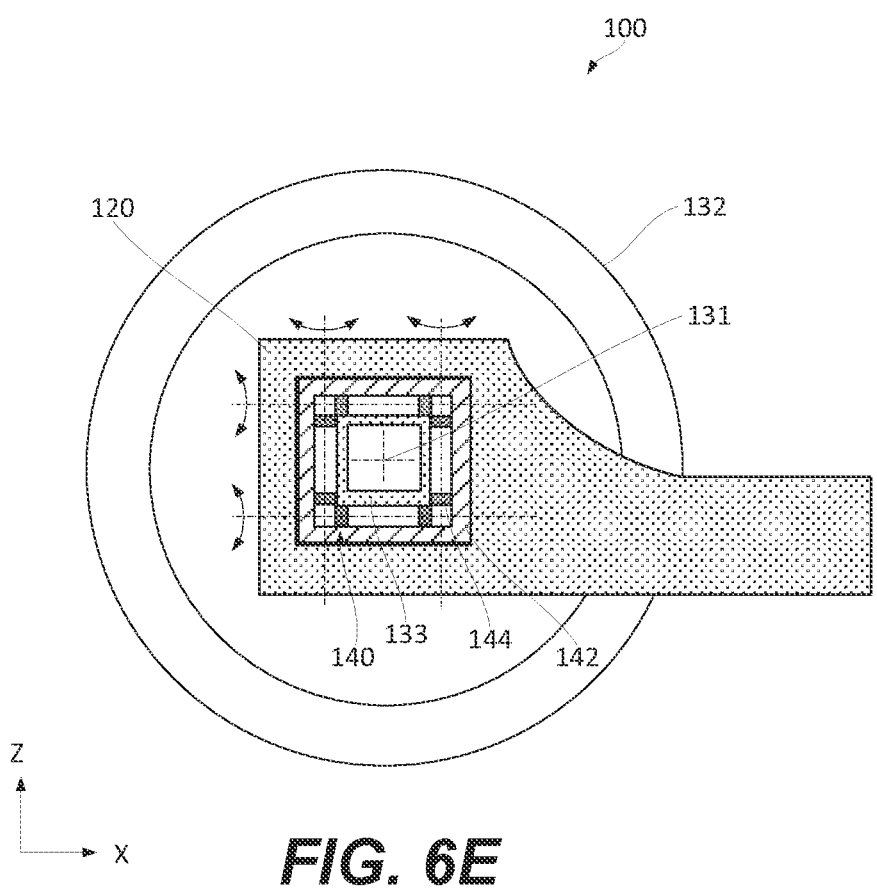

Referring to FIG. 6E, in some examples, outer linear bearing set 144 comprises four pairs of linear bearings. Each pair is disposed between one side of wheel axle 133 and a corresponding side of outer sleeve 142, e.g., proximate to the ends of each side of wheel axle 133. In this example, outer sleeve 142 is identified as a separate component. Alternatively, outer sleeve 142 can be integrated into support structure 120, e.g., the frame of electric vehicle 100. In other words, each corner of wheel axle 133 is surrounded by two linear bearings. This approach ensures that wheel axle 133 can move relative to outer sleeve 142 or, more generally, relative to support structure 120 while transferring the torque between wheel axle 133 and support structure 120.

Referring to FIGS. 6A and 6B, in some examples, wheel axle 133 forms inner sleeve 146. Track adjustment mechanism 140 further comprises inner linear bearing set 148 slidably coupling inner sleeve 146 to an additional wheel axle 135 while additional wheel axle 135 at least partially protrudes into inner sleeve 146. Wheel axle 133 and additional wheel axle 135 are concentric. In more specific examples, track adjustment mechanism 140 further comprises additional linear bearing set 149 slidably coupling outer sleeve 142 to additional wheel axle 135 while additional wheel axle 135 at least partially protrudes into outer sleeve 142. Inner linear bearing set 148 and/or additional linear bearing set 149 can be configured in a manner similar to outer linear bearing set 144 described above with reference to FIG. 6E.

Referring to FIGS. 6C and 6D, in some examples, electric vehicle 100 further comprises additional wheel axle 135 and additional wheel 134, rotatably coupled and supported by additional wheel axle 135. Wheel axle 133 and additional wheel axle 135 are concentric. Track adjustment mechanism 140 further comprises additional outer linear bearing set 147 slidably coupling outer sleeve 142 to additional wheel axle 135 while additional wheel axle 135 at least partially protrudes into outer sleeve 142. In some examples, wheel 132 and additional wheel 134 can be independently adjustable.

Figure 7A:
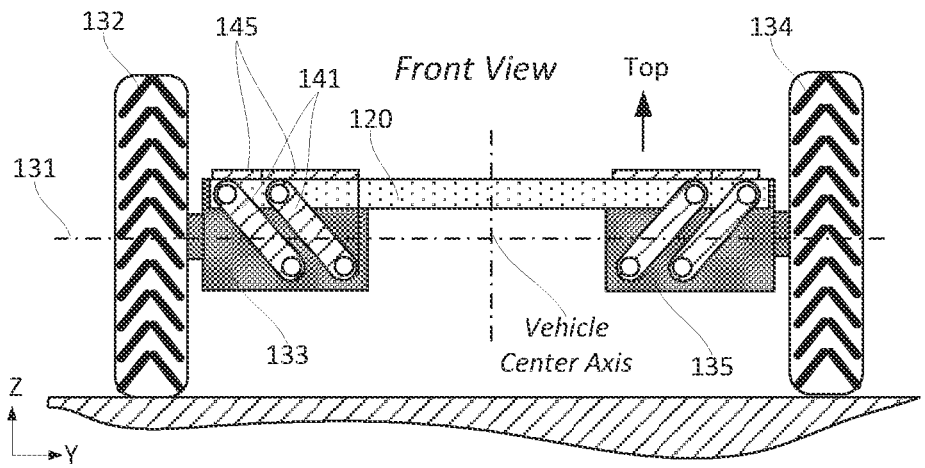
FIGS. 7A, 7B, and 7C are schematic views of a track adjustment mechanism comprising control arms, in accordance with some examples.
Figure 7B:
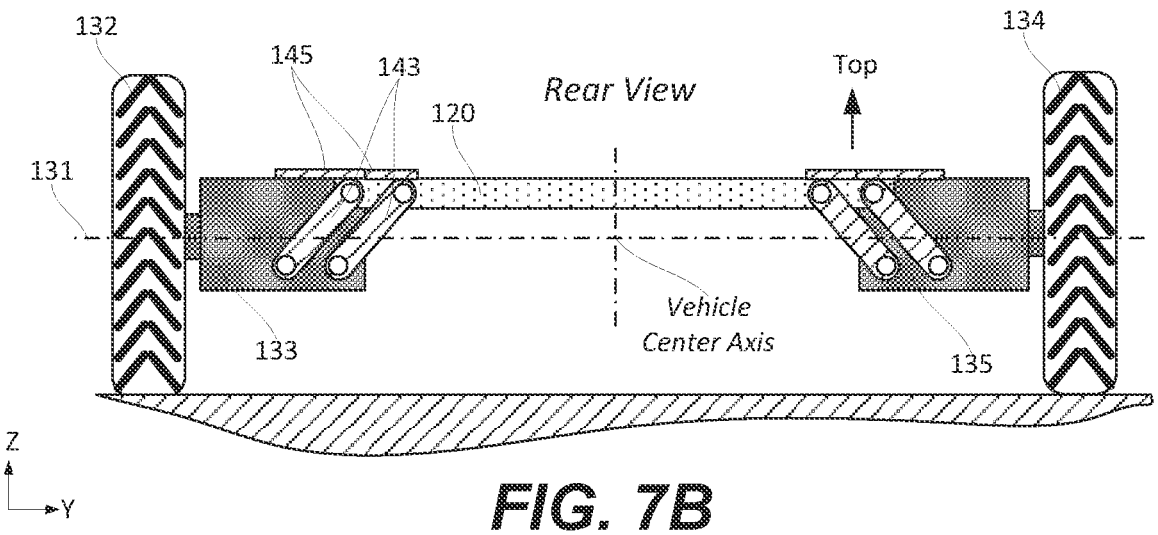
Figure 7C:
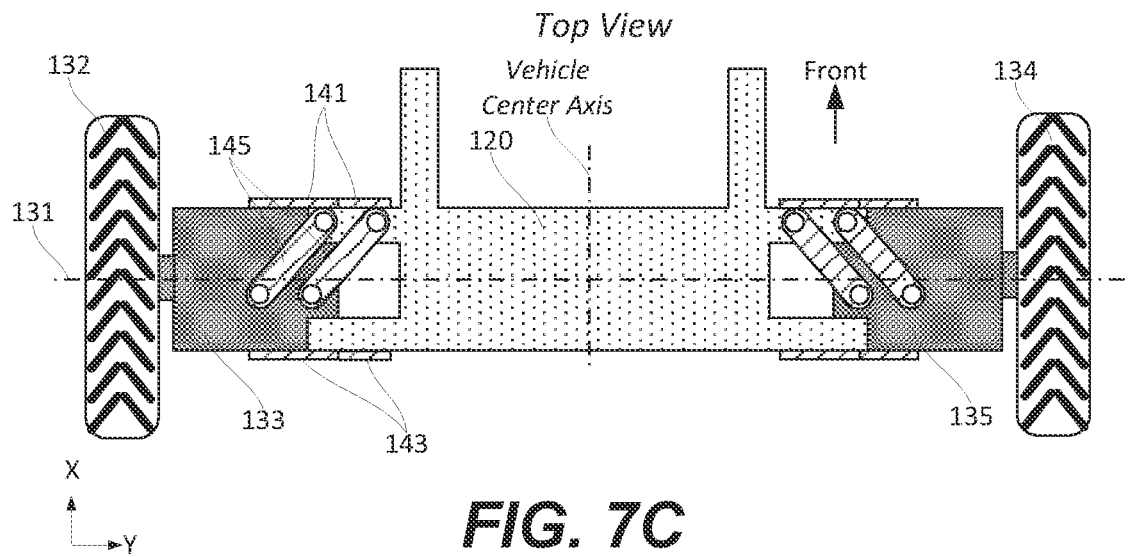

Referring to FIGS. 7A-7C, in some examples, track adjustment mechanism 140 comprises front control arms 141, rear control arms 143, and horizontal control arms 145, each pivotably coupled to wheel axle 133 and to support structure 120. This combination of control arms helps to support wheel axle 133 (and additional wheel axle 135) relative support structure 120, e.g. to transfer the weight of electric vehicle 100 to the ground. At the same time, pivoting of these control arms relative to wheel axle 133 (and additional wheel axle 135) and also relative support structure 120 can be used to change the track width.

EV Controller Examples

Figure 8:
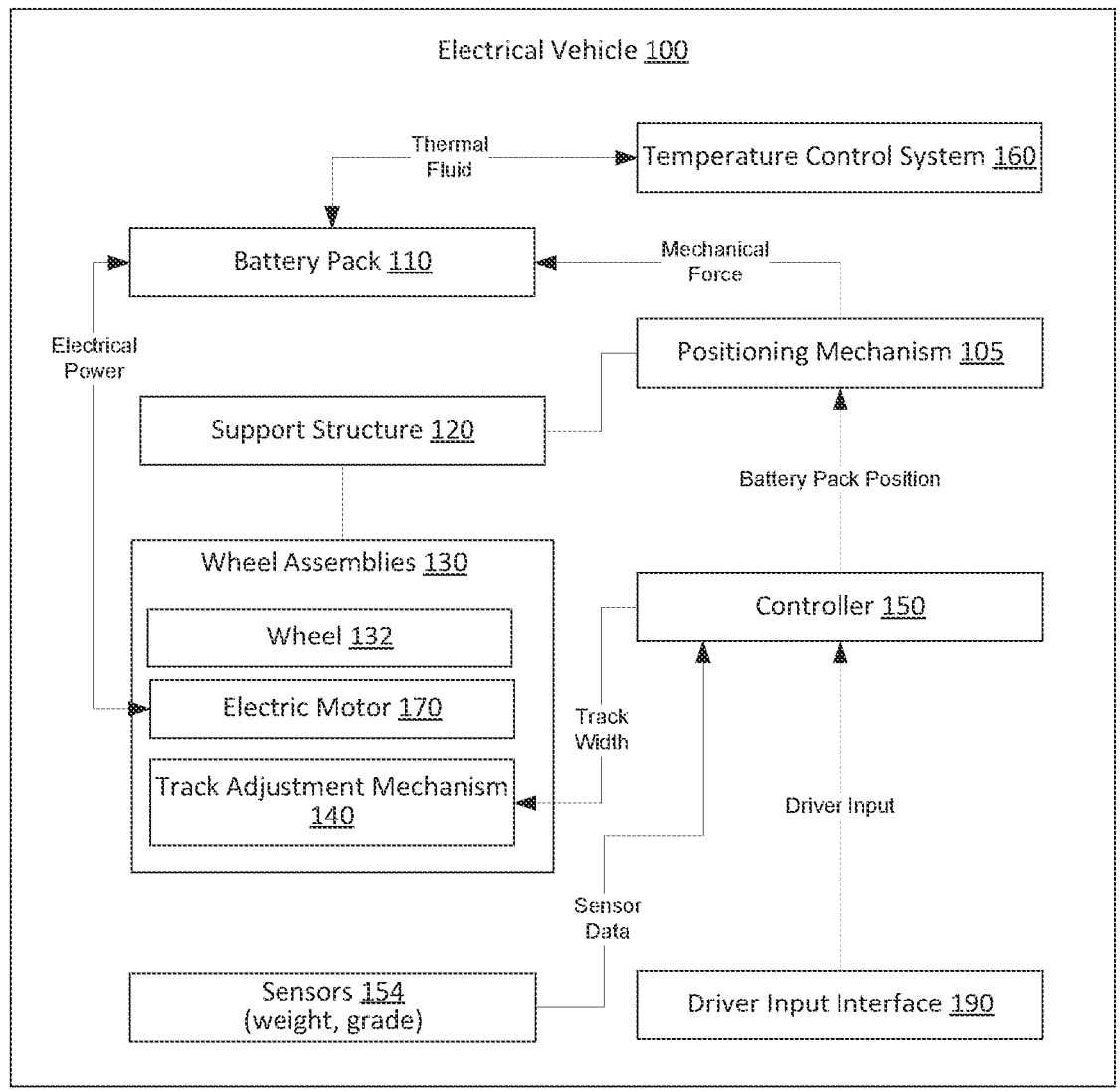
FIG. 8 is a block diagram of an electric vehicle illustrating interactions among various components of the electric vehicle, in accordance with some examples.

Referring to FIG. 8, in some examples, electric vehicle 100 further comprises controller 150 and one or more sensors 154, communicatively coupled to controller 150. One or more sensors 154 are configured to sense one or more characteristics selected from the group of weight (e.g., at each wheel), pressure (e.g., in a hydraulic system), road grade, and vehicle speed. Controller 150 is configured to determine the position of battery pack 110, relative to support structure 120, based on one or more characteristics received from one or more sensors 154. Alternatively, the position of battery pack 110 is provided manually, e.g., through driver input interface 190.

In either case, the position of battery pack 110 is transmitted to positioning mechanism 105, which moved battery pack 110 into this position (e.g., by generating a mechanical force acting on battery pack 110).

In some examples, controller 150 is also configured to determine the track width and forward control instructions to track adjustment mechanism 140. For example, the track width can be determined based on one or more characteristics listed above. Alternatively, the track width is provided manually, e.g., through driver input interface 190. Track adjustment mechanism 140 then uses the track width instructions to move wheels 132.

In some examples, electric vehicle 100 further comprises temperature control system 160, fluidically coupled to battery pack 110 and configured to control the temperature of battery pack 110 by exchanging thermal fluid with battery pack 110, wherein temperature control system 160 remains fluidically coupled to battery pack 110 while battery pack 110 is moved relative to support structure 120.

In some examples, electric vehicle 100 is autonomous.

Examples of Methods for Controlling EV Stability

Figure 9:
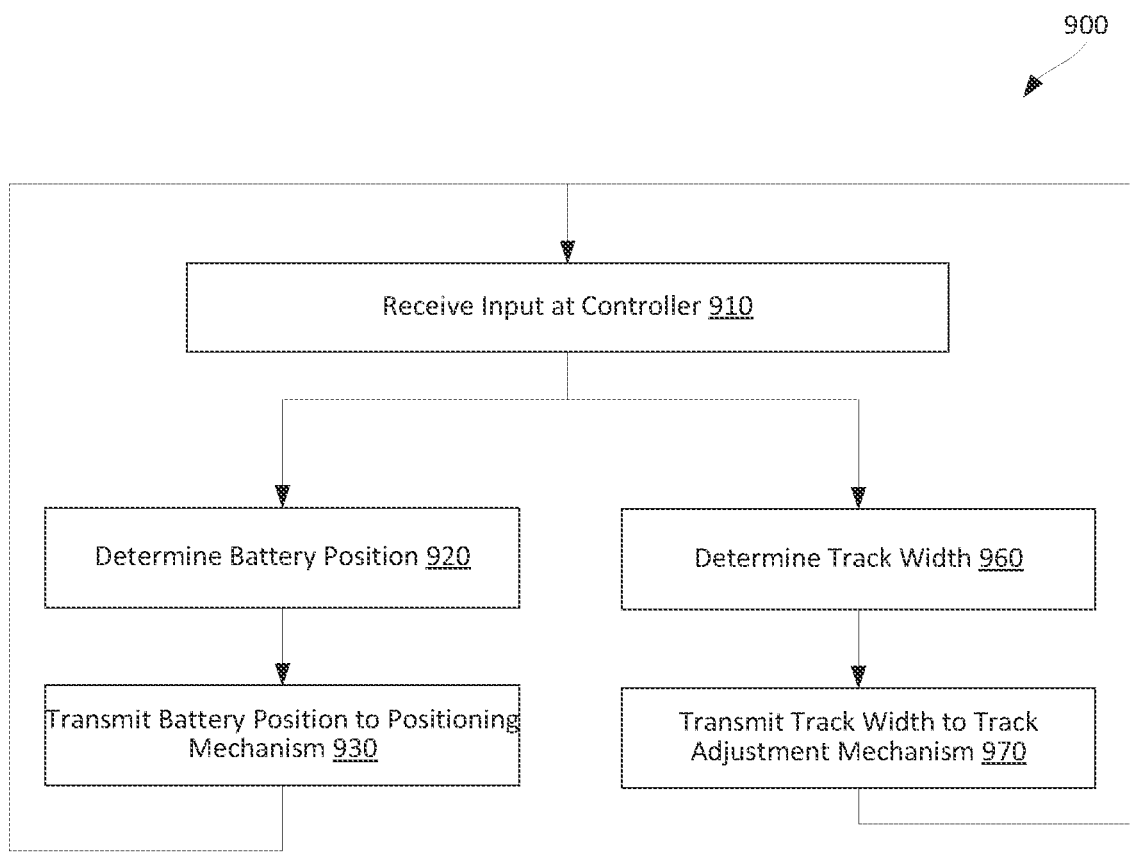
FIG. 9 is a process flowchart corresponding to a method for controlling the stability of an electric vehicle, in accordance with some examples.

FIG. 9 is a process flowchart of method 900 for controlling the stability of electric vehicle 100, in accordance with some examples. Various aspects and features of electric vehicle 100 are described above. In some examples, electric vehicle 100 comprises controller 150, battery pack 110, positioning mechanism 105, and support structure 120.

Method 900 comprises (block 910) receiving one or more inputs at controller 150 of electric vehicle 100. For example, one or more inputs can be received from one or more sensors 154 of electric vehicle 100. In more specific examples, one or more inputs at controller 150 represent changing weight distribution of electric vehicle 100. In other examples, the one or more inputs at controller 150 represent coupling one or more tractor implements to electric vehicle 100. Furthermore, the input can be provided from driver input interface 190.

Method 900 comprises (block 920) determining a set position of battery pack 110 relative to support structure 120. This set position is determined by controller 150 and based on one or more input to controller 150. For example, controller 150 can have a set of instructions for processing the input. The set position can be determined to compensate for various operating changes experienced by electric vehicle 100.

Method 900 comprises (block 930) moving battery pack 110 relative to support structure 120 to the set position. This moving operation is performed using positioning mechanism 105, coupled to battery pack 110 and to support structure 120. In some examples, this movement operation can change center of gravity 102 of electric vehicle 100. In the same or other examples, moving battery pack 110 to the set position is performed while electric vehicle 100 is moving.

In some examples, method 900 (block 960) determining the track width of electric vehicle 100 using controller 150. This track width is determined by controller 150 and based, for example, on one or more input to controller 150. For example, controller 150 can have a set of instructions for processing the input.

Method 900 comprises (block 970) changing the track width of electric vehicle 100 by repositioning one or more wheel assemblies 130 relative to support structure 120 using track adjustment mechanism 140 of a corresponding one of one or more wheel assemblies 130.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:
1. An electric vehicle, having a center of gravity, the electric vehicle comprising:
a support structure, forming an enclosed opening, operable as a frame of the electric vehicle, and comprising a removable support end, a base, and a lip, connected to the base and forming an open channel between the base and the lip;

a battery pack, movably coupled to the support structure and comprising a pack enclosure and pack protrusions, wherein:

the pack protrusions slidably protruding within the open channel of the support structure, the pack enclosure comprises a first enclosure portion and a second enclosure portion, the second enclosure portion extends over and past the removable support end of the support structure, the first enclosure portion comprises a half side, protruding into the enclosed opening and ending and operable as a positive stop when contacting the removable support end, the first enclosure portion comprises a center portion and two overhang portions such that the center portion protrudes into the enclosed opening and such that the support structure protrudes between the center portion and each of the two overhang portions; and a positioning mechanism, coupled to the battery pack and configured to move the battery pack within the electric vehicle relative to the support structure thereby changing the center of gravity of the electric vehicle.

2. The electric vehicle of claim 1, wherein the positioning mechanism is selected from the group consisting of a hydraulic cylinder and an electric linear actuator.

3. The electric vehicle of claim 1, further comprising a controller and one or more sensors, communicatively coupled to the controller, wherein:

the one or more sensors are configured to sense one or more characteristics selected from the group of weight of the electric vehicle, pressure in one or more systems of the electric vehicle, road grade, and speed of the electric vehicle, and the controller is configured to determine a desired position of the battery pack, relative to the support structure, based on the one or more characteristics received from the one or more sensors.

4. The electric vehicle of claim 1, wherein the battery pack is movable relative to the support structure while the electric vehicle is in motion.

5. The electric vehicle of claim 1, further comprising an electric motor, configured to propel the electric vehicle, wherein the electric motor remains electrically coupled to the battery pack while the battery pack is moved relative to the support structure.

6. The electric vehicle of claim 5, further comprising a wheel axle and a wheel assembly, rotatably coupled to the wheel axle and comprising a wheel, wherein:

the electric motor is a hub motor positioned in the wheel assembly, and the electric motor is configured to rotate the wheel relative to the wheel axle.

7. The electric vehicle of claim 6, wherein the wheel axle has a rectangular cross-section for transferring reaction torque between the electric motor and the support structure.

8. The electric vehicle of claim 5, further comprising a temperature control system, fluidically coupled to the battery pack and configured to control the temperature of the battery pack by exchanging a thermal fluid with the battery pack, wherein the temperature control system remains fluidically coupled to the battery pack while the battery pack is moved relative to the support structure.

9. The electric vehicle of claim 1, wherein a weight portion of the battery pack in the electric vehicle is at least 30%.

10. The electric vehicle of claim 1, wherein the base is formed by a rectangular tube with an aspect ratio of at least 2.

11. The electric vehicle of claim 1, wherein the electric vehicle is autonomous.

12. The electric vehicle of claim 1, wherein the electric vehicle is selected from the group of a tractor and a loader.

13. The electric vehicle of claim 1, wherein the pack enclosure is wider than the support structure.

14. A method for controlling stability of an electric vehicle comprising a controller, a battery pack, a positioning mechanism, and a support structure, the method comprising:

receiving one or more inputs at the controller of the electric vehicle;

determining, by the controller and based on the one or more input to the controller, a set position of the battery pack relative to the support structure; and moving the battery pack relative to the support structure to the set position using the positioning mechanism, coupled to the battery pack and to the support structure, thereby changing the center of gravity of the electric vehicle, wherein:

the support structure forms an enclosed opening, is operable as a frame of the electric vehicle, and comprises a removable support end, a base, and a lip, connected to the base and forming an open channel between the base and the lip, the battery pack is movably coupled to the support structure and comprises a pack enclosure and pack protrusions, the pack protrusions slidably protruding within the open channel of the support structure, the pack enclosure comprises a first enclosure portion and a second enclosure portion, the second enclosure portion extends over and past the removable support end of the support structure, the first enclosure portion comprises a half side, protruding into the enclosed opening and ending and operable as a positive stop when contacting the removable support end, and the first enclosure portion comprises a center portion and two overhang portions such that the center portion protrudes into the enclosed opening and such that the support structure protrudes between the center portion and each of the two overhang portions.

15. The method of claim 14, wherein moving the battery pack to the position is performed while the electric vehicle is moving.

16. The method of claim 14, wherein the one or more inputs at the controller represent changing of the weight distribution of the electric vehicle.

17. The method of claim 14, wherein:
the electric vehicle is a tractor, and
the one or more inputs at the controller represent coupling one or more tractor implements to the electric vehicle.

18. The method of claim 14, further comprising:
receiving one or more additional inputs at the controller of the electric vehicle;
determining a track width of the electric vehicle using the controller; and
changing the track width of the electric vehicle by repositioning one or more wheel assemblies relative to the support structure using a track adjustment mechanism of a corresponding one of the one or more wheel assemblies.

19. The method of claim 14, wherein:

the electric vehicle comprises a temperature control system fluidically coupled to the battery pack, and the temperature control system remains fluidically coupled to the battery pack while the battery pack is moved relative to the support structure.

\* \* \* \* \*